(12) United States Patent
Marsico

(10) Patent No.: US 8,364,124 B2
(45) Date of Patent: Jan. 29, 2013

(54) METHODS, SYSTEMS, AND COMPUTER READABLE MEDIA FOR TOKENIZATION OF MULTIMEDIA MESSAGES

(75) Inventor: Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 13/028,875

(22) Filed: Feb. 16, 2011

(65) Prior Publication Data

US 2011/0201314 A1    Aug. 18, 2011

Related U.S. Application Data

(60) Provisional application No. 61/305,800, filed on Feb. 18, 2010.

(51) Int. Cl.
*H04M 1/725* (2006.01)
(52) U.S. Cl. .................. 455/412.1; 370/231
(58) Field of Classification Search .............. 455/412.1, 455/406, 557, 450, 574, 466; 725/105, 14.07, 725/14.53; 370/231, 230; 709/231, 214, 709/203, 218, 200
See application file for complete search history.

(56) References Cited

U.S. PATENT DOCUMENTS

| | | | |
|---|---|---|---|
| 2006/0085829 A1* | 4/2006 | Dhodapkar et al. | 725/105 |
| 2009/0247132 A1* | 10/2009 | Sumcad et al. | 455/412.1 |
| 2009/0249082 A1* | 10/2009 | Mattsson | 713/193 |

OTHER PUBLICATIONS

Burger, "A Mechanism for for Content Indirection in Session Initiation Protocl (SIP) Messages," Network Working Group RFC 4483, pp. 1-16 (May 2006).
Rosenberg et al., "SIP: Session Initiation Protocol," Network Working Group, RFC 3261, pp. 1-252 (Jun. 2002).

* cited by examiner

*Primary Examiner* — Kiet Doan
(74) *Attorney, Agent, or Firm* — Jenkins, Wilson, Taylor & Hunt, P.A.

(57) ABSTRACT

Methods, systems, and computer readable media for processing multimedia messages are disclosed. One method includes receiving a first multimedia messaging service (MMS) message containing a first payload. The method further includes extracting and caching the first payload. The method further includes associating a token with the first payload and replacing, in the MMS message, the first payload with a second payload containing the token thereby establishing a modified MMS message. The method further includes forwarding the modified MMS message to the message recipient.

18 Claims, 4 Drawing Sheets

METHODS, SYSTEMS, AND COMPUTER READABLE MEDIA FOR TOKENIZATION OF MULTIMEDIA MESSAGES

PRIORITY CLAIM

This application claims the benefit of U.S. Provisional Patent Application Ser. No. 61/305,800 filed Feb. 18, 2010, the disclosure of which is incorporated herein by reference in its entirety.

TECHNICAL FIELD

The subject matter described herein relates to methods, systems, and computer readable media for processing multimedia messages. More specifically, the subject matter described herein relates to methods, systems, and computer readable media for tokenization of multimedia messages, in for example a store and forward environment.

BACKGROUND

Multimedia messaging service (MMS) is a service for delivering multimedia messages between subscribers with MMS capable client devices, such as cellular phones and personal data assistants (PDAs). MMS has the ability to process messages including images, audio, and video, as well as text. Store and forward delivery services can be provided by one or more network elements. For example, a multimedia message service center (MMSC) is the most commonly employed MMS message delivery node used by current MMS systems. MMSCs typically employ a store and forward delivery method. In a store and forward delivery method, messages are received at the MMSC and stored in a database. Delivery is attempted, and if successful, the message is deleted from the database. Alternatively, if an initial delivery attempt is unsuccessful, the message is stored in the MMSC until a successful delivery attempt. Messages that are stored awaiting retried delivery attempts are placed in what is called a message queue. When multiple messages to a subscriber cannot be delivered, they are stored in an order according to predetermined criteria, such as the order in which they were received. When a subscriber's device reconnects to the network, the MMSC retrieves all queued messages in the database for that subscriber and transmits them in order.

Carriers employing store and forward MMS systems must adjust to current trends in the network environment by continuously adjusting their storage and routing capacity through the addition or subtraction of MMSCs from their networks. Individual MMSCs can combine message storage and routing functions into a single hardware platform. If additional message storage or routing capacity is desired, additional MMSCs can be added to the network. Depending on the type and size of media content routed by the network environment, carriers may have to purchase multiple MMSCs to achieve the necessary storage capacity. In the event that an MMSC or MMSC component fails, the functionality of that MMSC may be restricted or its service suspended because it lacks the ability to redistribute the load to other MMSCs until the affected component is repaired. The need to continuously adjust storage capacity by purchasing MMSCs combined with the lack of ability to efficiently redistribute loads can be burdensome to carriers and disruptive to service provided to subscribers.

Accordingly, in light of these difficulties, a need exists for improved methods, systems, and computer readable media for tokenization of multimedia messages.

SUMMARY

Methods, systems, and computer readable media for tokenization of multimedia messages is disclosed. One method of tokenization includes receiving a first multimedia messaging service (MMS) message containing a first payload. The method further includes extracting and caching the first payload. The method further includes associating a token with the first payload and replacing, in the MMS message, the first payload with a second payload containing the token thereby establishing a modified MMS message. The method further includes forwarding the modified MMS message to the message recipient.

A system for assigning and processing multimedia messages in a store and forward messaging environment is disclosed, the system includes a tokenization node for receiving a first multimedia messaging service (MMS) message containing a first payload. The system further includes a tokenization module for extracting and caching the first payload and for associating a token with the first payload. The first payload in the first MMS message is replaced with a second payload containing the token thereby forming a modified MMS message. The modified MMS message can be forwarded to the message recipient by the tokenization node.

The subject matter described herein for tokenization of multimedia messages may be implemented using software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that, when executed by the processor of a computer, control the computer to perform the steps of the aforementioned method. Exemplary computer readable media suitable for implementing the subject matter described herein include disk memory devices, chip memory devices, programmable logic devices, and application specific integrated circuits. In one implementation, the computer readable medium may include a memory accessible by a processor. The memory may include instructions executable by the processor for implementing any of the methods for processing multimedia messages described herein. In addition, a computer readable medium that implements the subject matter described herein may be located on a single device or computing platform or may be distributed across multiple devices or computing platforms.

As used herein, the term "node" refers to a physical computing platform including one or more processors and memory.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for tokenization of multimedia messages. Accordingly, the subject matter described herein provides for methods, systems, and computer readable media for intercepting multimedia messaging service (MMS) messages containing multimedia content and replacing the content with a token uniquely associated with the multimedia content. The subject matter described herein provides a way for reducing the amount of internal message storage capacity required of the multimedia messaging service center (MMSC) for providing store and forward services. As will be described herein, one advantage of the subject matter described herein includes increasing efficiency of processing multimedia messages in a store and forward environment as the token requires less memory than the original multimedia content. In addition, for cases where a large number of subscribers send or forward MMS messages to multiple recipients, only one copy of the multimedia content needs to be stored as opposed to storing one copy for each recipient. As a result, the time and resources expended by processing multimedia content using MMS systems is reduced. Embodiments of the subject matter described herein will now be explained in greater detail with reference to FIGS. 1 through 4 below.

Figure 1:
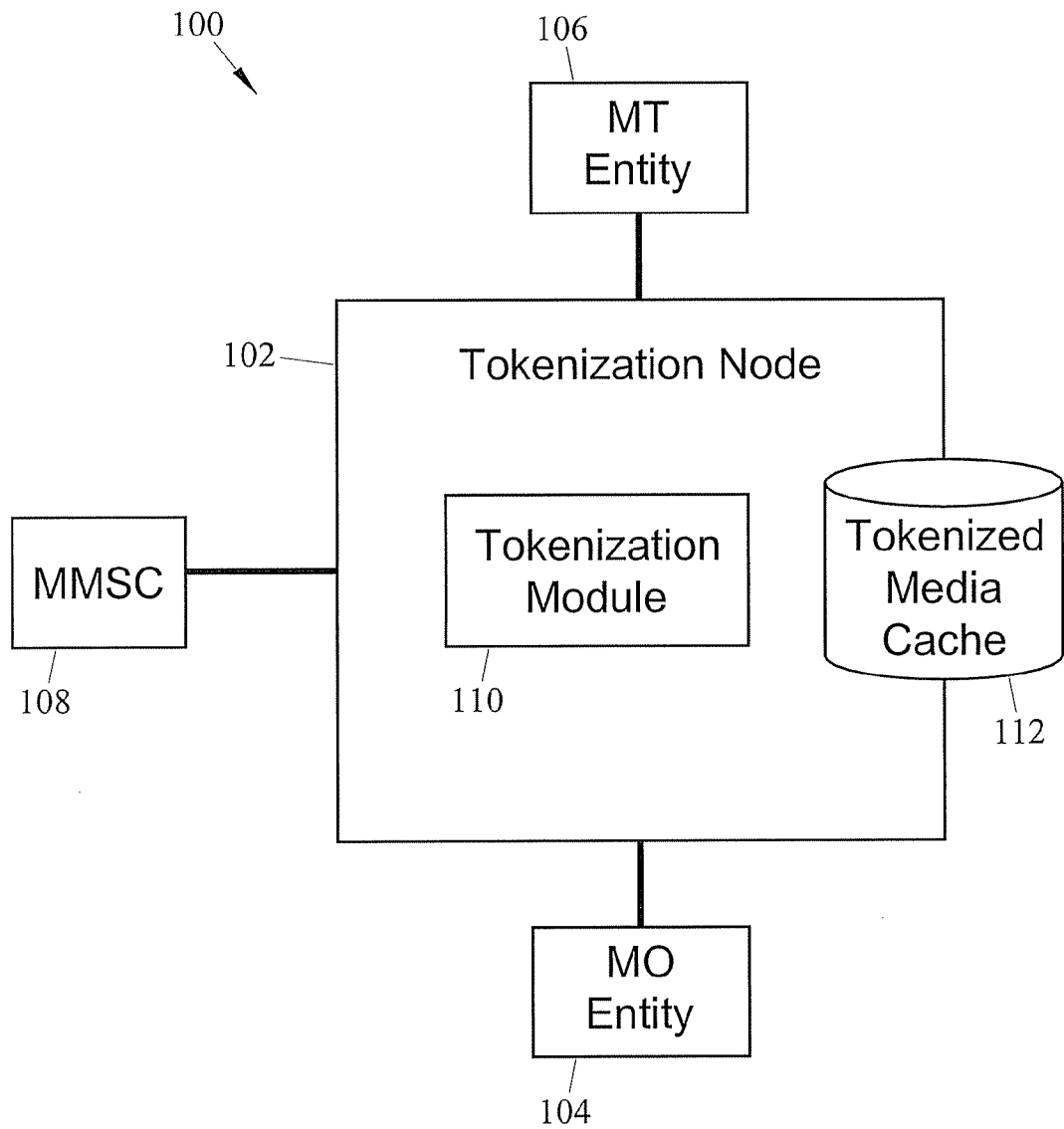
FIG. 1 is a block diagram of an entity for tokenization of multimedia messages according to an embodiment of the subject matter described herein.

FIG. 1 is a block diagram illustrating a message processing system generally designated 100, according to an embodiment of the subject matter described herein. Referring to FIG. 1, message processing system 100 includes a tokenization node 102 which can include an intermediary element for receiving and routing signaling traffic in a network during a communication session between a mobile originated (MO) entity 104 a mobile terminated (MT) entity 106 and/or a multimedia messaging service center (MMSC) 108. In one embodiment, tokenization node 102 can intercept messages sent by MO entity 104 and/or MT entity 108 prior to the messages being received at the MMSC 108. Tokenization node 102 can include a messaging element utilizing session initiation protocol (SIP), specified in the Internet Engineering Task Force (IETF) RFC 3261, for session control of communication sessions between parties exchanging various forms of media, such as audio, text, video, and image. In one aspect, the communication session can include a multimedia communication session in which MO entity 104 and MT entity 106 send or exchange one or more MMS messages containing multimedia content. Each of MT entity 104 and MO entity 106 can include one or more network elements for establishing and tearing down communication sessions such as a SIP user agent (UA). As used herein, a "SIP UA" or "UA" refers to a logical network endpoint used to communicate SIP messages. A UA may perform the role of a SIP user agent client (UAC), which sends SIP requests, or a user agent server (UAS), which receives requests and returns SIP responses on behalf of one or more subscribers.

In one embodiment, tokenization node 102 can include an intermediary element for intercepting and routing messages between MO and/or MT entities 104 and 106 and MMSC 108. Tokenization node 102 can include a SIP proxy, a SIP relay node, or a SIP-MMS router element in conjunction with a tokenization module 110. Tokenization module 110 may intercept MMS messages generated at MO entity 104 and/or MT entity 106 prior to receipt at MMSC 108. Tokenization module 110 may also intercept MMS messages routed from MMSC 108 prior to receipt at MO entity 104 and/or MT entity 106. That is, tokenization module 110 can be disposed at tokenization node 102 located between MMSC 108 and MT/MO entities 104 and 106, respectively.

Tokenization module 110 may extract multimedia content from an intercepted MMS message containing a first multimedia payload and cache the content in a tokenized media cache 112. Tokenized media cache 112 may be integrated at tokenization node 102, or, in the alternative, tokenized media cache 112 can comprise a separate node which can be accessible by tokenization node 102 and/or tokenization module 110. In one embodiment, tokenization module 110 can replace the cached multimedia content with a temporary token including a short text, subscriber identifier, and/or numeric token. In other embodiments, tokenization module 110 can replace the cached multimedia content with a permanent token. A permanent token can include any token capable of facilitating direct retrieval of the cached data, for example, a uniform resource locator (URL). Any suitable form and method of generating temporary and/or permanent tokens is contemplated. Tokenization module 110 can be configured to uniquely associate the temporary and/or permanent token with the cached multimedia content.

Figure 3:
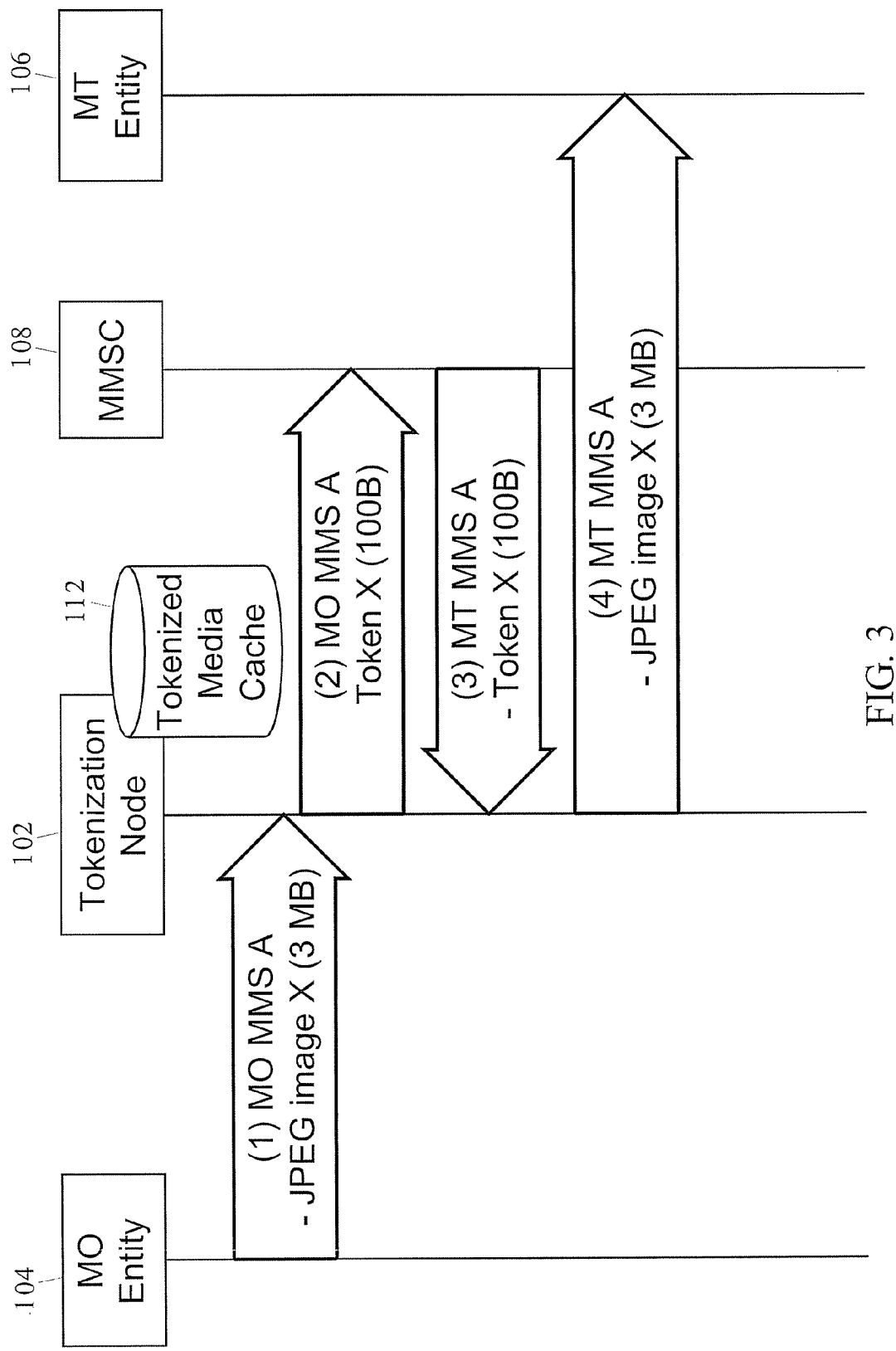
FIG. 3 is a message flow diagram illustrating exemplary messages exchanged for tokenization of multimedia messages according to an embodiment of the subject matter described herein.

Still referring to FIG. 1, in a first embodiment, tokenization module 110 may perform temporary tokenization. In performing temporary tokenization, tokenization module 110 may intercept a first MMS message routed by MO entity 104 prior to receipt at the serving MMSC 108. An example of the message flow for this embodiment is illustrated in FIG. 3 and discussed further below. MO entity 104 can direct an MMS message containing a first multimedia content payload to an MMS client recipient routed through MT entity 106. In typical MMS systems, MMSC 108 can perform store and forward services and route MMS messages sent or exchanged between MO entity 104 and MT entity 106. Tokenization node 102 can intercept MMS messages before they are received at MMSC 108. Tokenization module 110 can extract the first multimedia content payload and cache the content in tokenized media cache 112. Tokenized media cache 112 can store, for example, audio, video, image, graphic, or text data associated with MMS message. Tokenized media cache 112 can include any suitable cache or database structure for storing message and payload content. For example, tokenized media cache 112 may include a structured query language (SQL) database which may be integrated at tokenization node 102 or located on any suitable hardware platform or storage medium without departing from the scope of the subject matter described herein. In one aspect, tokenized media cache 112 includes a media content server accessible by the MMS messaging recipients, or subscriber clients.

Upon extracting and caching the first multimedia content payload, tokenization module 110 can replace the payload with a temporary short text, identifier, and/or numeric code thereby creating a modified MMS message having a tokenized payload. The token can be uniquely associated with the cached multimedia content payload. The modified MMS message can be much smaller in size than original MMS message sent by MO entity 104 as the token can be much smaller in size than the original multimedia content payload. For example, MO entity 104 can transmit an MMS message having a 5 megabyte (MB) multimedia content payload, for example, a 5 MB image, audio, or video payload. Tokenization module 110 can extract and cache the 5 MB payload and replace it with a 50 byte (B) temporary token which can be uniquely associated with the 5 MB payload. The modified MMS message can be forwarded to a store and forward multimedia messaging service application including, for example, an MMSC. The modified MMS message having the tokenized payload can subsequently be routed to the MMSC 108 for providing store and forward services for the message. Notably, tokenization node can potentially greatly reduce the amount of internal message storage capacity required of MMSC 108 and thereby allow carriers to increase storage capacity without purchasing additional MMSC store and forward servers.

Upon receiving the first modified MMS message, MMSC 108 can initiate the MMS delivery process by generating a standard delivery message to recipient entity, for example, to MT entity 106. The MMS message can include the tokenized payload. Tokenization node 102 can intercept the MMS message having the tokenized payload and extract the token. The token can be associated and replaced with the corresponding multimedia content payload that was stored in tokenized media cache 112 thereby forming a second modified MMS message. The modified MMS message containing the first payload can then be routed and delivered to the intended MMS message recipient as normal. In one embodiment, the cached multimedia content can be associated with token using any suitable method. For example, token-based hashing can be used which at least partially includes applying a secure hash function to generate a token which uniquely represents and/or associates the cached multimedia content. In other embodiments, tokens can include a payload identifier such as unique numbers, letters, or subscriber identifiers and/or combinations thereof which can be associated with the tokenized, cached multimedia content. Such numbers, letters, or subscriber identifiers can be generated using any suitable method. Table 1.0 below contains examples of exemplary tokenized media cache data:

TABLE 1.0

EXEMPLARY TOKENIZED MEDIA CACHE DATA

| Date/<br>Time Stamp | Token Value | Tokenized<br>Payload Content |
|---|---|---|
| Feb. 17, 2011, 23:10:23 | 2313 | Bigvideoclip.mpeg |
| Feb. 17, 2011, 23:10:27 | subscriber@ATT.net | Highresphoto.jpeg |
| Feb. 17, 2010, 23:10:27 | subscriber@ATT.net | Highdefmusic.mp3 |

Table 1.0 illustrates a numeric token including a unique string of numbers to represent a video payload. The string of numbers could be used alone and/or in combination with date and time stamp information to associate the tokenized payload with the token. Table 1.0 further illustrates a token value including a subscriber identifier, for example, an email address associated with multiple tokenized payloads. In this embodiment, the address could be used alone or in combination with the date and time stamp information to route the correct message to MT entity 106 using tokenization node 102. Any suitable token value and method of associating token values with cached, tokenized payload content is contemplated.

Figure 4:
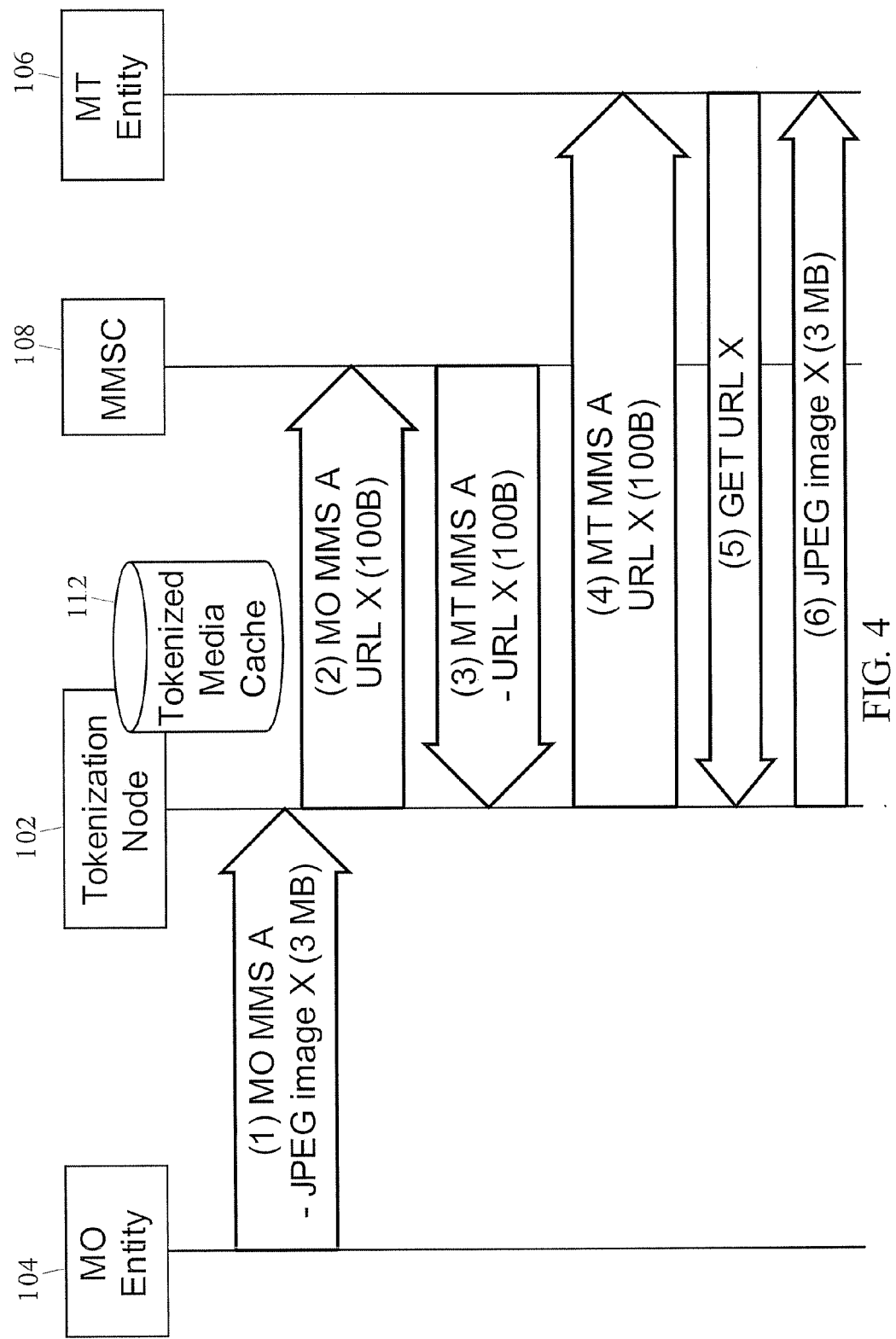
FIG. 4 is a message flow diagram illustrating exemplary messages exchanged for tokenization of multimedia messages according to an embodiment of the subject matter described herein.

In other embodiments, tokenization module 110 can perform permanent tokenization. Tokenization node 102 may intercept a first MMS message containing a first multimedia content payload routed by MO entity 104 prior to receipt at the serving MMSC 108. The message flow for this embodiment is illustrated in FIG. 4 and is discussed further below. MO entity 104 can direct an MMS message containing a multimedia content payload to MT entity 106 which is typically first received at MMSC 108. Tokenization node 102 can intercept MMS message before it is received at MMSC 108. Tokenization module 110 can extract the multimedia content payload and cache the content within tokenized media cache 112. Tokenization module 110 can then insert a permanent token uniquely associated with the cached content thereby forming a first modified MMS message. Permanent tokenization can include permanently storing the cached information until accessed and/or otherwise retrieved by the MMS message recipient. That is, upon insertion, the token will not be subsequently extracted and replaced with the cached content to form a second modified MMS message, but rather, the token can facilitate direct retrieval of the cached content at tokenized media cache 112. For example, upon extracting and caching the multimedia content payload of the original MMS message, tokenization module 110 can then replace the content with a permanent token including a URL associated with the cache. The permanent token can be smaller in size than the cached multimedia content payload.

Upon inserting the permanent token, the modified MMS message containing the tokenized payload can then be routed to MMSC 108 as normal. MMSC 108 can provide standard store and forward services for the modified MMS message. Notably, since the permanent tokenized payload is smaller than the cached multimedia content payload, the internal message storage capacity required of MMSC 108 for providing the store and forward services is potentially greatly reduced. MMSC 108 can initiate MMS message delivery by generating an MMS message including the tokenized payload directed to MT entity 106 for delivery to the MMS message recipient. The MMS message recipient can select the URL by pressing a virtual button triggering the URL or by using any other suitable selection method. Upon selecting the URL, the MMS message recipient can access the tokenized media cache 112 directly using the URL. The URL can be associated with the first payload for retrieving or otherwise displaying the cached multimedia content. Upon receipt of the cached content, MMS message recipient can then be prompted to save, discard, or otherwise process the multimedia content after retrieval.

Notably, whether using temporary or permanent tokenization, tokenization node 102 can increase efficiency of a given MMS system by eliminating the need for storage of multiple messages at the MMSC 108. For example, a first subscriber can forward a plurality of MMS messages containing the same multimedia content payload to a plurality of recipients. Typically, MMSC 108 must provide store and forward services for each forwarded message. That is, multiple copies of the same multimedia content must be stored multiple times depending upon the number of recipients. If however, multimedia content payload is tokenized at tokenization node 102, only one copy needs to be stored in tokenized media cache 112. The multimedia content can be associated and replaced by smaller sized tokens for which MMSC 108 initiates delivery. Thus, tokenization node 102 saves or otherwise improves storage capacity at the MMSC 108 by preventing multiple copies of the same multimedia content from being stored therein.

Figure 2:
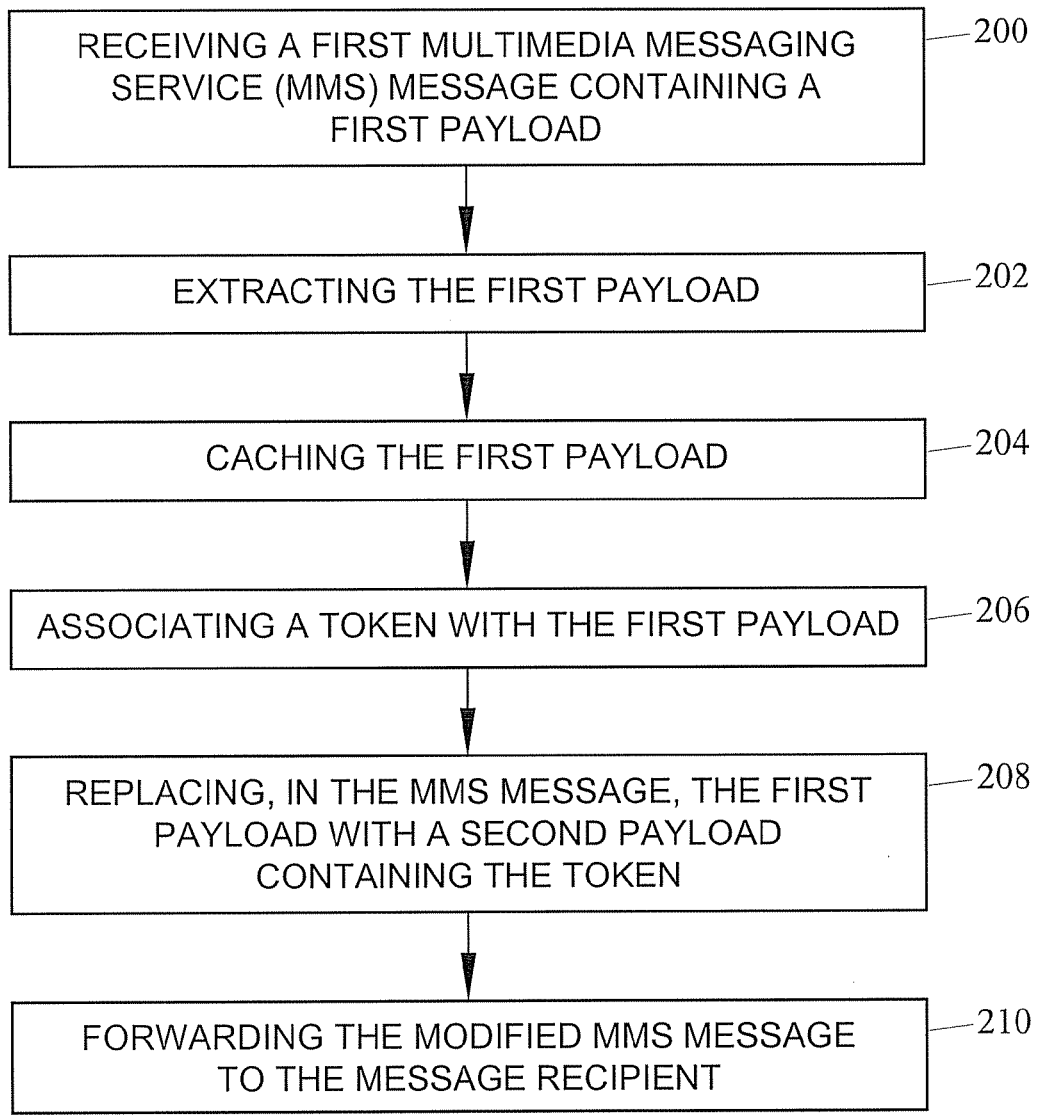
FIG. 2 is a flow chart illustrating exemplary steps for tokenization of multimedia messages according to an embodiment of the subject matter described herein.

FIG. 2 is a flow chart illustrating an exemplary method for tokenization of multimedia messages according to an embodiment of the subject matter described herein. Referring to FIG. 2, in step 200 a first MMS message can be received. The first MMS message can contain a first payload of multimedia content. The first MMS message can be received at tokenization node 102 prior to receipt at the MMSC. In one embodiment, tokenization node 102 can include a SIP node, relay, or router in combination with tokenization module 110.

In step 202, the first payload can be extracted. For example, tokenization module 110 can extract the first payload. In step 204, the method can further include caching the first payload. The first payload can be cached in tokenized media cache 112. In step 206, a token is associated with the first payload. The token can be smaller in size than the cached media content payload. The token can include a temporary or permanent token. In one embodiment, the temporary token can include a string of numbers, text, or other identifier. The permanent token can include a token which could directly access the cached content, for example, a URL or other suitable locator.

Still referring to FIG. 2, in step 208, the first payload can be replaced in the MMS message with a second payload containing the token. A modified MMS message can therefore be generated at tokenization node 102. In one embodiment, the tokenization module 110 can replace the first payload with a second payload containing the token. In step 210, the modified MMS message can be forwarded to the message recipient. The modified MMS message can include the second tokenized payload. The modified MMS message can be received by the MMSC which can initiate normal store and forward services. Where the token is permanent, the MMS message recipient can select, for example, the URL and access the originally cached payload. Where the token is temporary, the tokenization node can intercept the delivery MMS message generated at the MMSC prior to reaching the MT entity and extract the token. The token can be extracted and replaced with the first payload, and the MMS message can be routed to the MMS message recipient.

FIG. 3 is a message flow diagram illustrating exemplary messaging for processing multimedia messages using the systems and methods described herein. Steps 1 to 4 can include SIP signaling used to process multimedia messages wherein tokenization node 102 intercepts messages in the MMS system. Referring to step 1 of FIG. 3, MO entity 104 directs a first MMS message, deemed "MO MMS A" to MT entity 106. MO MMS A can include a first multimedia content payload, for example, JPEG image X consisting of 3 MB. In conventional MMS systems, MO MMS A including the 3 MB payload would be stored and forwarded by MMSC 108. Using exemplary messaging processing systems, methods, and computer readable media described herein, tokenization node 102 can intercept MO MMS A at step 1 prior to the message being received at MMSC 108. At step 1, tokenization node 102 can extract the 3 MB JPEG image X and cache it in a tokenized media cache 112. Tokenization node 102 can replace the cached 3 MB JPEG payload with TOKEN X. TOKEN X can include a smaller size than first payload, for example, TOKEN X can consist of 100 B. This is several orders of magnitude smaller in size than the first payload of MO MMS A, thereby reserving internal storage space required at MMSC 108.

Referring to step 2 of FIG. 3, tokenization node 102 can direct the modified MMS message containing TOKEN X to MT Entity 106. MMSC 108 can receive the tokenized message and initiate store and forward services. In step 3, MMSC 108 can initiate delivery by routing an MMS message deemed "MT MMS A" directed to MT Entity 106. For example, MMSC 108 can direct MT MMS A containing the 100 B TOKEN X to MT Entity 106. In step 3, tokenization node 102 intercepts MT MMS A and extracts the 100 B token. The extracted 100 B token can be associated with the first payload using any suitable method. Tokenization node 102 can replace the token with the corresponding cached first payload content. In this message flow, TOKEN X can be extracted and subsequently associated with and replaced by JPEG image X.

In step 4, tokenization node 102 can direct the modified MT MMS A message containing the original 3 MB JPEG Image X to MT Entity 106 for subsequent routing to MMS message recipient.

FIG. 4 is a message flow diagram illustrating exemplary messaging for tokenization of multimedia messages using the systems and methods described herein. Steps 1 to 6 can include SIP signaling used to process multimedia messages wherein tokenization node 102 intercepts messages in an MMS system. Referring to step 1 of FIG. 4, MO entity 104 can direct a first MMS message, deemed "MO MMS A" to MT entity 106. MO MMS A can include a first multimedia content payload, for example, JPEG image X consisting of 3 MB. In conventional MMS systems, MO MMS A including the 3 MB payload would be stored and forwarded by MMSC 108. Using exemplary messaging processing systems, methods, and computer readable media described herein, tokenization node 102 can intercept MO MMS A at step 1 prior to the message being received at MMSC 108. At step 1, tokenization node 102 can extract the 3 MB JPEG image and cache it in tokenized media cache 112. Tokenization node 102 can replace the cached 3 MB JPEG payload with a permanent token, for example, URL X. URL X can include a smaller size than first payload, for example, URL X can consist of 100 B. This is several orders of magnitude smaller in size than the first payload of MO MMS A, thereby reserving internal storage space required at MMSC 108.

Referring to step 2 of FIG. 4, tokenization node 102 can direct the modified MMS message containing URL X to MT Entity 106. MMSC 108 can receive the tokenized message and initiate store and forward services. In step 3, MMSC 108 can initiate delivery by sending an MMS message deemed "MT MMS A" directed to MT Entity 106. For example, MMSC 108 can direct MT MMS A containing the modified MMS message with the 100 B URL X to MT Entity 106. In step 4, tokenization node 102 can intercept MT MMS A containing URL X and direct it to MT Entity 106 for subsequent routing to MMS message recipient. The MMS message recipient can select URL X, and in step 5, MT Entity 106 can signal tokenization node 102 to invoke retrieval of the first payload. In step 5, the URL can be associated with the first payload, for example, URL X can be associated with the 3 MB JPEG image X at tokenization node 102. In step 6, the first payload can then be routed by tokenization node 102 and received at MT Entity 106. MT entity 106 can subsequently deliver the first payload to MMS message recipient. MMS client can then save or delete the multimedia content comprising the first payload.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for tokenization of multimedia messages in a store and forward messaging environment, the method comprising:
    receiving a first multimedia messaging service (MMS) message containing a first payload prior to the first MMS message being received by a message recipient;
    extracting the first payload;
    caching the first payload;
    associating a token with the first payload;
    replacing, in the first MMS message, the first payload with a second payload containing the token thereby establishing a modified MMS message; and forwarding the modified MMS message to the message recipient,
wherein replacing, in the MMS message, the first payload with a second payload containing the token comprises replacing the first payload with the token having fewer bytes of information than the first payload.

2. The method of claim 1, wherein the first payload includes at least one of video information, audio information, or graphic information.

3. The method of claim 1, wherein associating a token with the first payload comprises associating a uniform resource locator (URL) with the first payload.

4. The method of claim 1, wherein caching the first payload comprises storing the first payload in a tokenization media cache that is accessible by a tokenization node.

5. The method of claim 1, wherein forwarding the modified MMS message to the message recipient comprises forwarding the modified MMS message to a store and forward multimedia messaging service center (MMSC).

6. The method of claim 1, where in response to receiving from the message recipient a request for the second payload that includes the token, providing the first payload to the message recipient.

7. The method of claim 1, where in response to subsequently receiving the modified MMS message, replacing the token with the first payload thereby forming a second modified message and forwarding the second modified MMS message to the message recipient.

8. A system for assigning and processing multimedia messages in a store and forward messaging environment, the system comprising:
a tokenization node for receiving a first multimedia messaging service (MMS) message containing a first payload prior to the first MMS message being received by a message recipient;
a tokenization module for extracting and caching the first payload and for associating a token with the first payload; and
wherein the first payload in the first MMS message is replaced with a second payload containing the token thereby forming a modified MMS message, and the modified MMS message being forwarded to the message recipient by the tokenization node,
wherein the token comprises fewer bytes of information than the first payload.

9. The system of claim 8, wherein the first payload comprises at least one of video information, audio information, or graphic information.

10. The system of claim 8, wherein the token comprises a permanent token.

11. The system of claim 10, wherein the permanent token comprises uniform resource locator (URL) uniquely associated with the first payload.

12. The system of claim 8, wherein the token comprises a temporary token.

13. The system of claim 12, wherein the temporary token comprises at least one of a letter, number, time and date stamp, or a subscriber identifier uniquely associated with the first payload.

14. The system of claim 8, wherein the first payload is stored in a tokenized media cache accessible by the tokenization node.

15. The system of claim 8, the modified MMS message is forwarded to a store and forward multimedia messaging service center (MMSC).

16. The system of claim 8, wherein the tokenization node sends the first payload to the message recipient upon receiving a request from the message recipient.

17. The system of claim 8, where the tokenization node replaces the token with the first payload thereby forming a second modified message and forwards the second modified MMS message to the message recipient.

18. A non-transitory computer readable medium having stored thereon computer executable instructions that when executed by the processor of a computer control the computer to perform steps comprising:
receiving a first multimedia messaging service (MMS) message containing a first payload prior to the first MMS message being received by a message recipient;
extracting the first payload;
caching the first payload;
associating a token with the first payload;
replacing, in the first MMS message, the first payload with a second payload containing the token thereby establishing a modified MMS message; and forwarding the modified MMS message to the message recipient,
wherein replacing, in the MMS message, the first payload with a second payload containing the token comprises replacing the first payload with the token having fewer bytes of information than the first payload.

* * * * *